Figure 1:
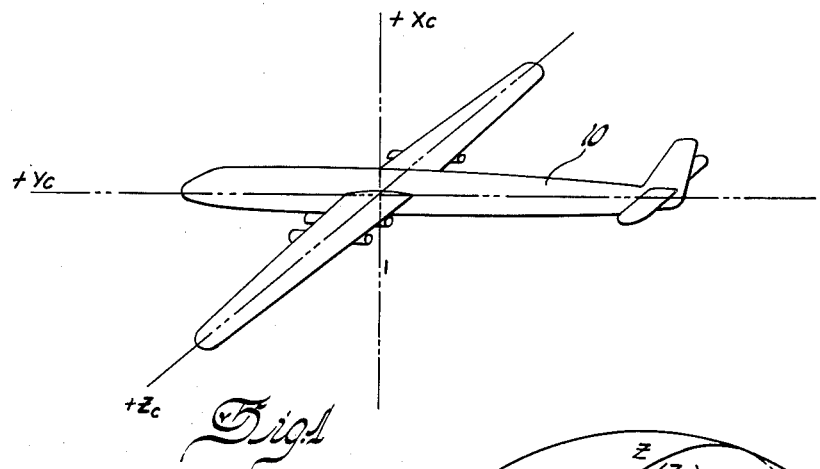

March 1, 1966

C. M. THEISS 3,237,887

INERTIAL GUIDANCE SYSTEM

Filed Nov. 27, 1959

4 Sheets-Sheet 1

INVENTOR.
Calvin M. Theiss
BY
Paul J. Ethington
ATTORNEY

March 1, 1966  C. M. THEISS  3,237,887
INERTIAL GUIDANCE SYSTEM
Filed Nov. 27, 1959  4 Sheets-Sheet 2

INVENTOR.
Calvin M. Theiss
BY
Paul J. Ethington
ATTORNEY

March 1, 1966

C. M. THEISS 3,237,887

INERTIAL GUIDANCE SYSTEM

Filed Nov. 27, 1959

4 Sheets-Sheet 3

INVENTOR.
Calvin M. Theiss
BY
Paul J. Ethington
ATTORNEY

March 1, 1966     C. M. THEISS     3,237,887
INERTIAL GUIDANCE SYSTEM
Filed Nov. 27, 1959     4 Sheets-Sheet 4

INVENTOR.
Calvin M. Theiss
BY Paul J. Ethington
ATTORNEY

United States Patent Office 3,237,887
Patented Mar. 1, 1966

3,237,887
INERTIAL GUIDANCE SYSTEM
Calvin M. Theiss, Arlington, Mass., assignor to General Motors Corporation, Detroit, Mich., a corporation of Delaware
Filed Nov. 27, 1959, Ser. No. 856,328
4 Claims. (Cl. 244—14)

This invention relates to navigation systems for vehicles and more particularly to an improved inertial guidance system for missiles and other aircraft.

For navigation in inertial or Earth space, it is convenient to establish a reference coordinate system having a known orientation relative to the fixed stars or the Earth to define the position and motion of the vehicle. Although an earth oriented system is not an inertial system in the strictest sense, because of the Earth's rotation and translation, it may be treated as an inertial system where non-rotating coordinate axes with an origin at the Earth's center are taken as the reference coordinates. Heretofore, the reference coordinates system has been defined within the vehicle by the so-called stabilized platform which supports sensing instruments and is mounted upon a set of gimbals to maintain a fixed orientation relative to the earth or to the fixed stars. It has also been proposed to utilize a coordinate reference system in which the axes are defined by values of electrical signals corresponding to each axis rather than by a physical platform. In this system, certain of the sensing instruments must be mounted for angular displacement relative to the vehicle frame. A system of this kind is disclosed and claimed in the copending patent application Serial No. 700,253 of Leo W. Tobin, "Coordinate Reference System," filed November 29, 1957, now Patent No. 3,131,292. In these prior art systems, the measurement of physical angles, such as servo shaft position, imposes a limitation upon the overall accuracy of the system. Another limitation upon the accuracy of such systems is the control of amplifier gain.

A principal feature of this invention is the provision of an inertial guidance system which does not require dynamic measurement or control of the angular position of physical members. A further feature is that the inertial guidance system is universal in the sense that it may be applied to inertial space guidance and terrestrial navigation, as well as control and indication of position relative to Earth. In general, this is accomplished by a measurements sub-system in which all sensing elements are fixed relative to the vehicle frame and supply information to a computer. The measurements sub-system comprises a set of three angular accelerometers having their input axes in orthogonal relationship and fixed relative to the vehicle frame and a set of three linear accelerometers with their input axes in orthogonal relationship and fixedly aligned with respective axes of the vehicle. The computer is preferably of the digital type and angular and linear acceleration signals, in digital form for each of the vehicle axes, are supplied to the computer. The computer determines the vehicle angular position relative to inertial coordinate reference system from the angular acceleration signals and resolves the linear accelerations about the aircraft inertial space angles to obtain the aircraft accelerations relative to inertial space.

Figure 2:
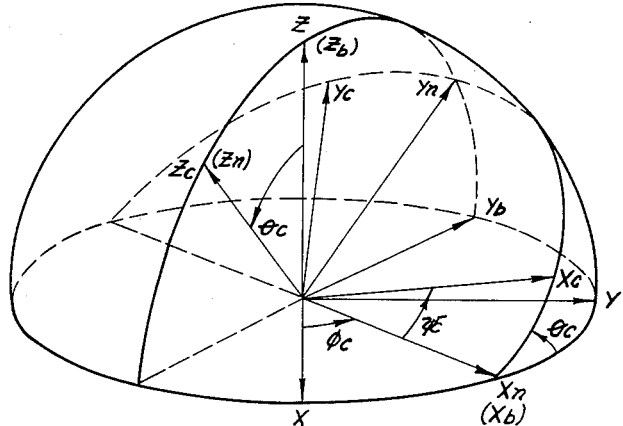
Figure 3:
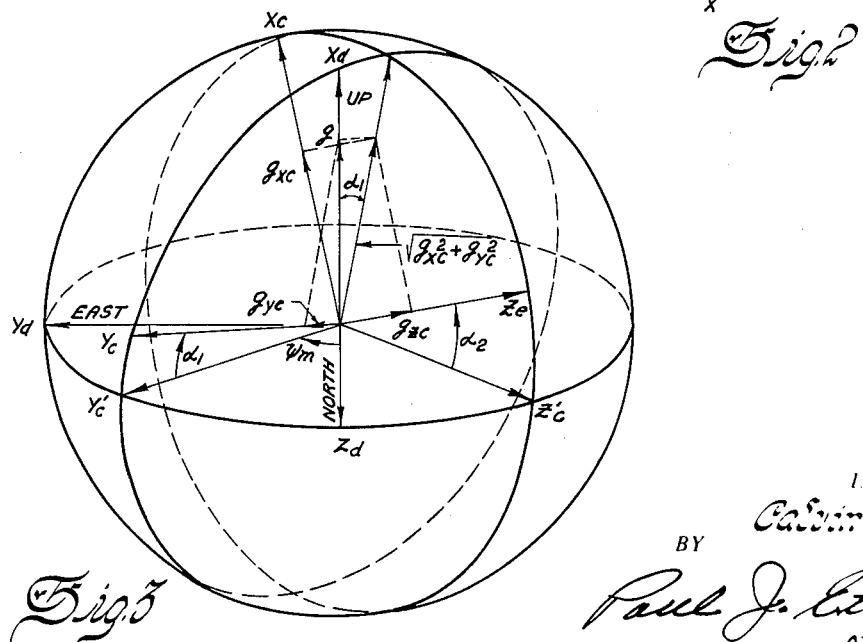
Figure 4:
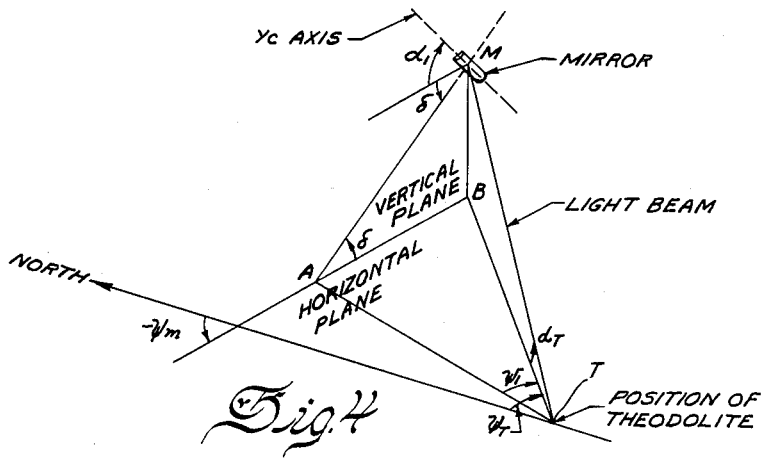
Figure 7:
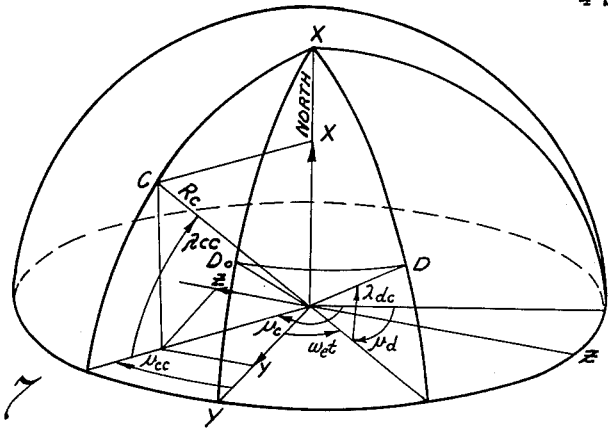
Figure 8:
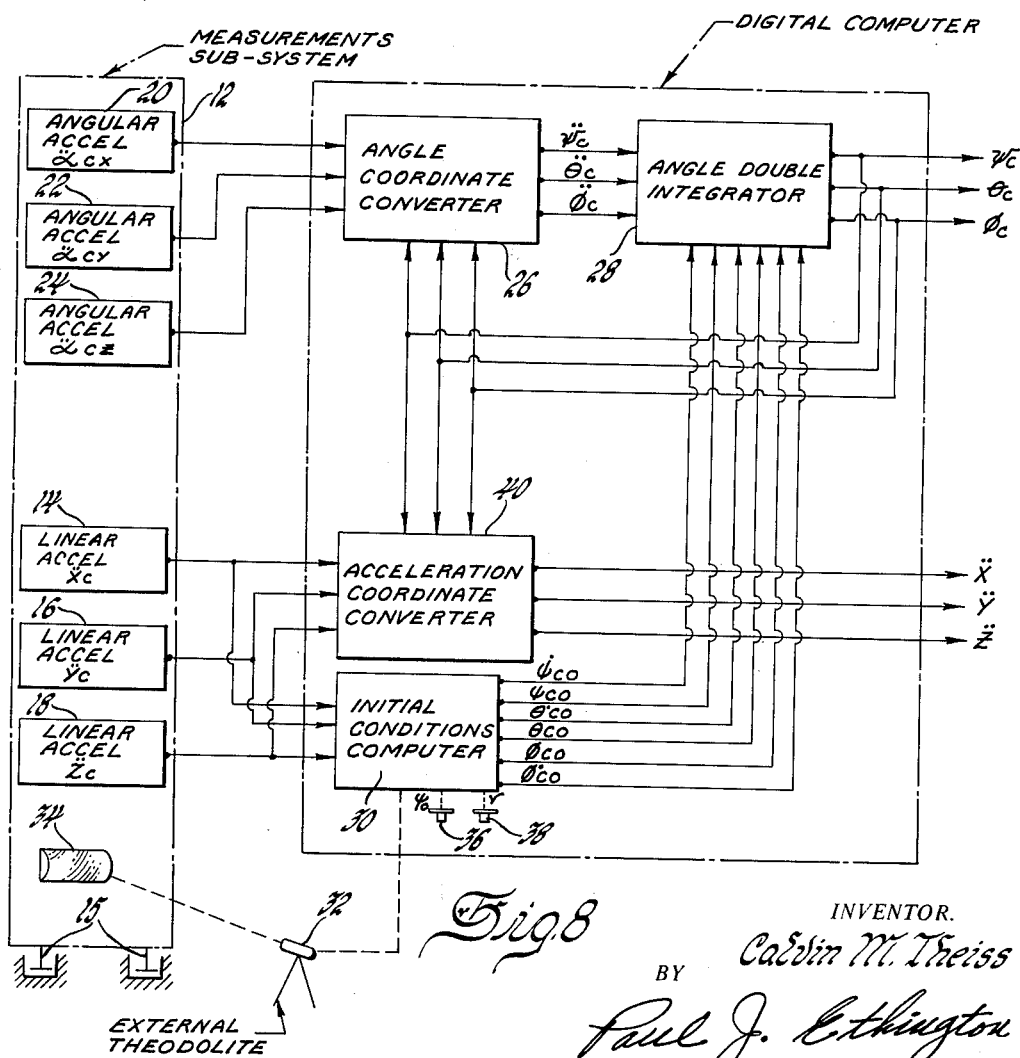
Figure 9:
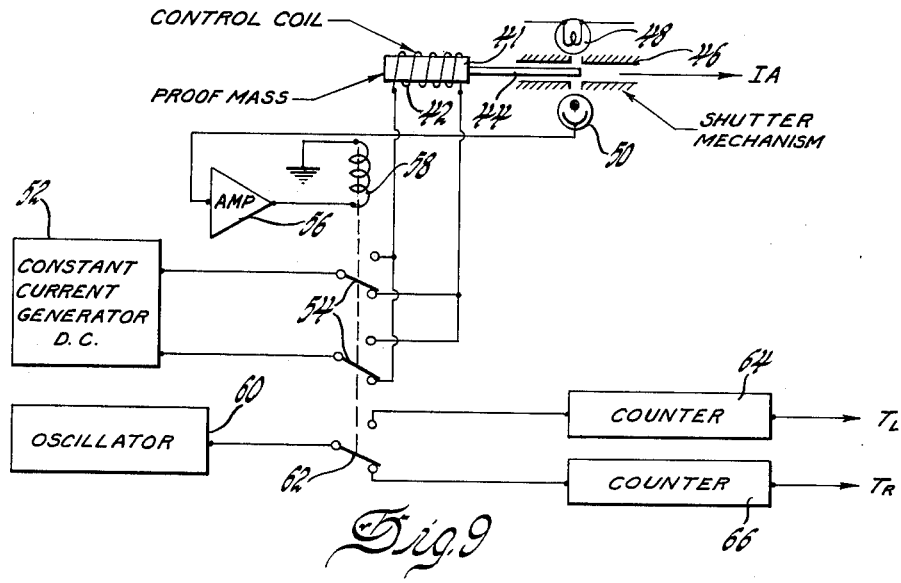
Figure 10:
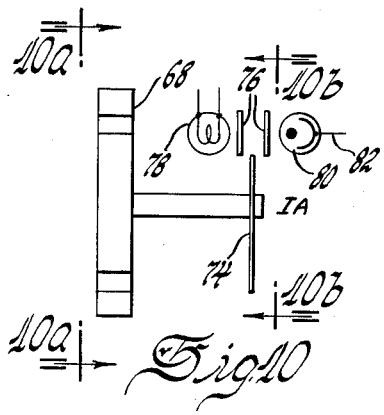
Figure 10A:
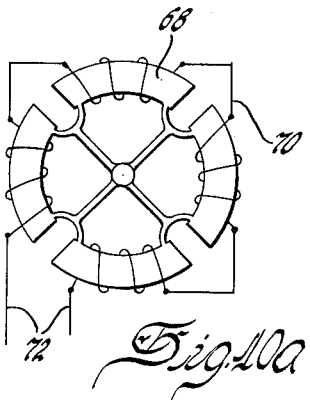
Figure 10B:
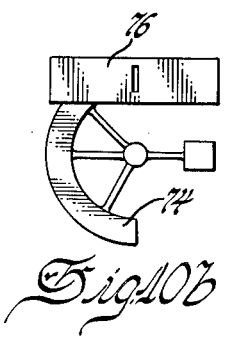

A more complete understanding of this invention may be had from the detailed description which follows taken with the accompanying drawings in which:

FIGURE 1 defines the aircraft coordinate axes;
FIGURE 2 shows the relation of the aircraft coordinate axes to the inertial coordinate reference axes;
FIGURE 3 shows the relationship between the aircraft axes and the departure point axes;
FIGURE 4 shows the azimuth alignment geometry;
FIGURES 5, 6, 6a, 6b, and 6c show the relationship of the inertial, aircraft, and selected intermediate axes;
FIGURE 7 shows the inertial reference coordinate axes for application of the invention in a position indicating system;
FIGURE 8 is a block diagram of the inertial guidance system;
FIGURE 9 is a diagram of a digital linear accelerometer; and
FIGURES 10, 10a, and 10b show a digital angular accelerometer.

Referring now to the drawings, there is shown an illustrative embodiment of the invention in an inertial guidance system which will be described as a universal system applicable to any desired earth or inertial space navigation and specific application to position indication system will be described.

The guidance system as shown in FIGURE 8 comprises a measurements sub-system and a digital computer. The measurements sub-system includes a support member or platform 12 which is fixedly mounted upon the aircraft frame by suitable shock absorbers 15. Digital linear accelerometers 14, 16 and 18 are rigidly mounted on the platform 12 with their input axes aligned with the mutually orthogonal $X_c$, $Y_c$ and $Z_c$ aircraft axes, respectively, and develop output signals in digital form which correspond to the linear acceleration along the respective aircraft axes. In FIGURE 1, an aircraft 10 provided with the subject inertial guidance system is shown with the aircraft coordinate axes $X_c$, $Y_c$ and $Z_c$ corresponding generally with the yaw, roll, and pitch axes, respectively. The aircraft coordinate axes have their origin at the center of the measurements sub-system and positive directions are as indicated in FIGURE 1.

A set of inertial coordinate reference axes X, Y, and Z are selected which are fixed relative to the fixed stars. Since the aircraft axes are subject to translational and angular motion with reference to the inertial coordinate reference axes X, Y, and Z, the signal quantities corresponding to the linear accelerations with reference to the aircraft axes are resolved about the Eulerian angles relating the two coordinate systems. For this purpose, angular accelerations of the aircraft about the aircraft axes are measured by the digital angular accelerometers 20, 22, and 24, respectively, which are mounted rigidly upon the platform with their input axes aligned with the $X_c$, $Y_c$, and $Z_c$ axes, respectively. The angular accelerometers develop output signal quantities, in digital form, corresponding to angular acceleration about the corresponding axis. The Eulerian angles $\psi_c$, $\theta_c$, and $\phi_c$ relating the $X_c$, $Y_c$ and $Z_c$ aircraft axes to the X, Y, and Z inertial axes, respectively, are determined by the digital computer from the angular acceleration signal quantities and provides aircraft attitude and azimuth information. Resolution of the linear acceleration signal quantities through the Eulerian angles yields acceleration with respect to the inertial axes. Velocity and position with respect to the inertial axes may be obtained by successive integrations with respect to time.

The only dynamic measurement signals required for the determination of the Eulerian angles and the inertial accelerations of the aircraft are supplied by the linear and angular accelerometers. The accelerometers are suitably of the type described by J. C. Lozier in "A New Class of Accelerometer," TRADIC Computer Research Program, Report for the Seventh Quarter, January 1, 1956, Bell Telephone Laboratories, Inc. The digital linear accelerometer, shown diagrammatically in FIGURE 9, responds only to accelerations along the input axis IA and comprises a proof mass 41 which constitutes the magnetic core of a control coil 42 and is adapted for oscillatory movement therein. The proof mass actuates a shutter 44 which reciprocates between a pair of shields 46 which define aligned apertures. A light source 48 is positioned on one side of the shutter to transmit light rays through the apertures to a photocell 50 on the other side of the shutter 44. The coil 42 is connected for energization to a constant current generator 52 through a reversing switch 54. The photocell 50 is connected through an amplifier 56 which energizes a relay coil 58 to actuate the reversing switch in response to each light impulse on the photocell to maintain the proof mass in a state of oscillation. The shutter 44 is proportioned so that it spends an equal amount of time on either side of the aperture when the proof mass is subjected to zero acceleration along the input axis. When the accelerometer is subjected to acceleration to the right, the resulting reaction will cause more time to be spent by the shutter on the left side of the aperture than on the right, and vice versa. In order to measure the time spent on each side of the aperture, a constant frequency oscillator 60 is connected through a switch 62 having its movable contact actuated between a pair of fixed contacts in synchronism with the reversing switch. One of the fixed contacts is connected with a counter 64 which develops an output signal $T_L$ corresponding to the number of oscillator cycles, or time, that the shutter spends on the left side of the aperture. A counter 66 is connected to the other fixed contact to develop an output signal $T_R$ which corresponds to the time spent on the right side of the aperture. In an accelerometer where the control coil exerts a force $F_C$ on the proof mass and the proof mass and the shutter have a mass $m$, the acceleration applied is:

$$A = \frac{F_C}{m} \frac{T_L - T_R}{T_L + T_R} \quad (1)$$

In this accelerometer, the frequency of oscillation of the proof mass should be sufficiently higher than the frequency of acceleration to be measured so that the acceleration can be considered constant over a complete cycle of proof mass oscillation. In the actual mechanization of the accelerometer, an electronic switch and control system may be used in place of the photocell and relays. Where the accelerometer is used in a system with a digital computer, the signals $T_L$ and $T_R$ are combined in the computer in accordance with Equation 1 to develop the acceleration information.

In the digital angular accelerometer, shown diagrammatically in FIGURES 10, 10a, and 10b, the proof mass 68 is mounted for angular oscillation about an input axis IA and responds to accelerations about this axis only. The proof mass 68 constitutes a magnetic core within a control coil 70 which is connected through conductor 72 to a reversing switch. The proof mass 68 actuates a shutter 74 between a pair of shields 76 which define aligned apertures. A light source 78 is positioned on one side of the shutter and a photocell 80 is positioned on the other side. In the angular accelerometer, the signal from the photocell on conductor 82 is used in the same manner as in the linear accelerometer to sustain oscillation of the proof mass and to develop a signal $T_L$ corresponding to the time the shutter spends on the left side of the aperture and a signal $T_R$ corresponding to the time spent on the right side of the aperture. The output signals of the angular accelerometer may be combined in a digital computer in accordance with Equation 1 where moment of inertia I and torque T are substituted for mass $m$ and force $F_C$, respectively, to develop angular acceleration information.

The accelerometer signals are supplied to the digital computer which is shown in functional block diagram since the specific structure of the computer forms no part of the present invention. The computer may be any one of several digital computers presently available such as the "TRADIC" from the Bell Telephone Laboratory, "NADAC" from the Burroughs Corporation, "G15D" from the Bendix Aviation Corporation, or the computer for 28007-LRI from the Radio Corporation of America. These computers are capable of solving the equations which will be developed hereinafter to develop the desired output signal quantities. In order to determine the Eulerian angles relating the aircraft axes to the inertial axes, the angular acceleration signals from the accelerometers 20, 22, and 24 are supplied to an angle coordinate converter 26 which develops signals corresponding to the second time derivative of the Eulerian angles and applies them to an angle double integrator 28, the output of which is fed back to the converter 26. In order to define the particular inertial coordinate reference axes X, Y, and Z, which are chosen for a selected navigation system, data is supplied from a pair of manually actuated devices 36 and 38 to an initial conditions computer 30. The computer also receives azimuth data from an alignment system such as an external theodolite 32 focused on a cylindrical mirror 34 which is mounted rigidly upon the platform 12. Local vertical information is supplied, with the system at rest on the Earth's surface, from the linear accelerometers 14, 16, and 18. The initial conditions computer 30 supplies data to the angle double integrator 28 which operates upon the second time derivative of the Eulerian angles to develop the angular values relating the aircraft axes to the inertial axes. In order to convert the aircraft linear acceleration signals to inertial acceleration signals, the output from the linear accelerometers 14, 16, and 18 are applied to an acceleration coordinate converter 40 wherein they are resolved about the Eulerian angles from the integrator 28 to provide signal quantities corresponding to linear acceleration of the aircraft with reference to the inertial axes.

In order to describe the operation of the inertial guidance system, it is convenient to employ mathematical notation. The symbology representing physical quantities involved will be defined as the description proceeds. To distinguish vector quantities from scalar quantities, the vector is denoted by a dash or line above the symbol for the quantity. Since the time rate of change of certain quantities is also involved, the first time derivative or velocity, as used herein, is denoted by a single dot above the symbol and the second time derivative or acceleration, as used herein, is denoted by a double dot above the symbol.

Since inertial and aircraft coordinate systems are used, it is necessary to convert acceleration components along the aircraft coordinate axes to acceleration components along the inertial coordinate axes. This may be done by use of the Coriolis equation as developed from Newton's law of force by Page in "Introduction to Theoretical physics," D. Van Nostrand Co., New York, N.Y., 1935, as follows:

$$\overline{A}_a = \ddot{\overline{p}} + \overline{w} x (\overline{w} x \overline{R}) + \dot{\overline{w}} x \overline{R} + 2\overline{w} x \overline{V} + \overline{A}_c \quad (2)$$

where $\overline{A}_a$ = acceleration with respect to inertial space,
$\overline{A}_c$ = acceleration with respect to aircraft space,
$\overline{R}$ = position of aircraft measurements sub-system with respect to aircraft coordinate origin,
$\overline{V}$ = velocity of measurements sub-system with respect to aircraft coordinate system,
$\overline{w}$ = angular velocity of aircraft coordinates with respect to inertial coordinates, and
$\overline{p}$ = position of aircraft coordinate origin with respect to inertial coordinate origin.

Since the aircraft axes are fixed to the measurements sub-system and the origin is coincident with the center of the measurements sub-system, the quantities $\overline{R}$, $\overline{V}$, and $\overline{A}_c$ are equal to zero and the Coriolis equation shows that the acceleration with respect to inertial space is equal to the acceleration of the aircraft coordinate origin with respect to the inertial coordinate origin.

Referring now to FIGURE 2, the Eulerian angles relating the aircraft axes to the inertial axes are shown as $\phi_c$, $\theta_c$, and $\Psi_c$. This angular relation of axes can be produced in three distinct steps by considering the aircraft axes initially coincident with the inertial axes. First, from the X, Y, and Z position, the axes are displaced about the inertial Z-axis through the Eulerian angle $\phi_c$ to the $b$-intermediate axes $X_b$, $Y_b$, and $Z_b$. Secondly, from the $b$-intermediate axes, the axes are rotated about the $X_b$ axis through the angle $\theta_c$ to the $n$-intermediate axes $X_n$, $Y_n$, and $Z_n$. Lastly, from the $n$-intermediate axes, the axes are rotated about the $Z_n$ intermediate axis through an angle $\Psi_c$ to the aircraft coordinate axes $X_c$, $Y_c$, and $Z_c$.

It is desired to obtain for this coordinate transformation the values of the Eulerian angles $\Psi_c$, $\theta_c$, and $\phi_c$ in terms of the angular acceleration components along the aircraft axes. By inspection of FIGURE 2, it is apparent that the second time derivative of $$\Psi_c \text{ or } \ddot{\Psi}_c$$

is equal to the angular acceleration $$\ddot{\alpha}_{cZ}$$

about the $Z_c$ axis. By double integration, the value of Eulerian angle $\Psi_c$ is obtained as $$\Psi_c = \int_0^t \left[ \int_0^t \ddot{\alpha}_{cZ} dt + \dot{\Psi}_{co} \right] dt + \Psi_{co} \quad (3)$$

where $$\Psi_{co} \text{ and } \dot{\Psi}_{co}$$

are initial values determined prior to flight in a manner described subsequently. Accordingly, in the system as shown in FIGURE 8, the angular accelerometer 24 develops a signal $$\ddot{\alpha}_{cZ}$$

which is applied to the angle coordinate converter 26 and transmitted thereby without modification to the integrator 28. The integrator, using the initial conditions signals $$\dot{\Psi}_{co} \text{ and } \Psi_{co}$$

from the computer 30, doubly integrates the signal $$\ddot{\alpha}_{cZ}$$

to obtain the output signal $\Psi_c$.

From FIGURE 2, it is also apparent that the second time derivative of the angle $\theta_c$, i.e. $\ddot{\theta}_c$, is equal to the angular acceleration $$\ddot{\alpha}_{nx}$$

about the $n$-intermediate X axis. The accelerometers 20 and 22 supply output signals $$\ddot{\alpha}_{cx} \text{ and } \ddot{\alpha}_{cy}$$

to the converter 26 wherein they are resolved through the angle $\Psi_c$ to obtain:

$$\ddot{\theta}_c = \ddot{\alpha}_{nx} = \ddot{\alpha}_{cx} \cos \Psi_c - \ddot{\alpha}_{cy} \sin \Psi_c \quad (4)$$

Now the Eulerian angle $\theta_c$ is obtained by applying the signal $\ddot{\theta}_c$ to the integrator 28 wherein it is doubly integrated and combined with the initial conditions signal $\theta_{co}$ and $\dot{\theta}_{co}$ from the computer 30 to obtain the output signal $\theta_c$ which may be expressed as $$\theta_c = \int_0^t \left[ \int_0^t (\ddot{\alpha}_{cx} \cos \Psi_c - \ddot{\alpha}_{cy} \sin \Psi_c) dt + \dot{\theta}_{co} \right] dt + \theta_{co} \quad (5)$$

where $\theta_{co}$ and $\dot{\theta}_{co}$ are initial values determined prior to flight in a manner to be described subsequently.

The second time derivative of $\phi_c$ is equal to the angular acceleration about the Z axis. Resolution through the angle $\Psi_c$ yields $$\ddot{\alpha}_{ny} = \ddot{\alpha}_{cy} \cos \Psi_c + \ddot{\alpha}_{cZ} \sin \Psi_c \quad (6)$$

$$\ddot{\alpha}_{nZ} = \ddot{\alpha}_{cZ} \quad (7)$$

Resolution of inertial values through the angle $\theta_c$ yields $$\ddot{\phi}_c = \ddot{\alpha}_{bZ} = \ddot{\alpha}_{nZ} \cos \theta_c + \ddot{\alpha}_{ny} \sin \theta_c \quad (8)$$

Substitution of Equations 6 and 7 into Equation 8 and double integrating yields $$\phi_c = \int_0^t \left\{ \int_0^t \left[ (\ddot{\alpha}_{cx} \sin \Psi_c + \ddot{\alpha}_{cy} \cos \Psi_c) \sin \theta_c + \ddot{\alpha}_{cZ} \cos \theta_c \right] dt + \dot{\phi}_{co} \right\} dt + \phi_{co} \quad (9)$$

where $$\phi_{co} \text{ and } \dot{\phi}_{co}$$

are initial values determined prior to flight. Accordingly, in the system, the converter 26 resolves the accelerometer signals $$\ddot{\alpha}_{cx}, \ddot{\alpha}_{cy}, \text{ and } \ddot{\alpha}_{cZ}$$

through the angles $\Psi_c$ and $\theta_c$ in accordance with the bracketed quantity of Equation 9 to obtain the signal $$\ddot{\phi}_c$$

This signal is applied to the integrator 28 wherein it is doubly integrated and combined with the initial conditions signals $$\dot{\phi}_{co} \text{ and } \phi_{co}$$

from the computer 30 to obtain the output signal $\phi_c$.

The output signals $\Psi_c$, $\theta_c$, and $\phi_c$ corresponding to the Eulerian angles expressed by Equations 3, 5, and 9 are utilized to determine the linear acceleration components of the aircraft along the inertial axes. This is accomplished by the acceleration coordinate converter by resolving the acceleration signals $$\ddot{X}_c, \ddot{Y}_c, \text{ and } \ddot{Z}_c$$

from the linear accelerometers 14, 16, and 18, through the Eulerian angles as follows:

$$\ddot{X} = \ddot{X}_c (\cos \phi_c \cos \Psi_c - \sin \phi_c \cos \theta_c \sin \Psi_c) - \ddot{Y}_c (\cos \phi_c \sin \Psi_c + \sin \phi_c \cos \theta_c \cos \Psi_c) + \ddot{Z}_c \sin \theta_c \sin \phi_c \quad (10)$$

$$\ddot{Y} = \ddot{X}_c (\cos \phi_c \cos \theta_c \sin \Psi_c + \sin \phi_c \cos \Psi_c) + \ddot{Y}_c (\cos \phi_c \cos \theta_c \cos \Psi_c - \sin \phi_c \sin \Psi_c) - \ddot{Z}_c \cos \phi \sin \theta_c \quad (11)$$

$$\ddot{Z} = \ddot{X}_c \sin \theta_c \sin \Psi_c + \ddot{Y}_c \sin \theta_c \cos \Psi_c + \ddot{Z}_c \cos \theta_c \quad (12)$$

The initial condition values $$\theta_{co}, \dot{\theta}_{co}, \phi_{co}, \dot{\phi}_{co}, \Psi_{co}, \dot{\Psi}_{co}$$

which are supplied to the integrator 28 for solution of Equations 3, 5, and 9 are developed by the initial conditions computer 30. Azimuth and vertical information, together with manually set-in values determined by the selection of inertial coordinates, are used to determine the initial condition values. The vertical direction at the departure point may be determined from the signals from the linear accelerometers which measure gravity components when the aircraft is not moving relative to Earth and the azimuth alignment of the aircraft may be determined by an external theodolite.

In order to determine these initial values, it is convenient to establish a third set of reference coordinate axes $X_d$, $Y_d$, and $Z_d$ which are fixed with respect to Earth and aligned upward along the departure point gravity vector, the eastward direction in the departure point horizontal, and northward in the departure point horizontal, respectively. The relative positions of the aircraft and the departure point axes are shown in FIGURE 3 and it is noted that the corresponding axes lie in the same general direction but are not necessarily coincident so that the requirement of precise alignment of the aircraft axes with the departure point axes may be avoided. It is noted that the aircraft axis $Y_c$ is displaced from the horizontal plane, which is defined by $Y_d-Z_d$, by an angle $a_1$ and that the aircraft axis $Z_c$ is displaced from the horizontal plane by the angle $a_2$ in the $Z_c'-Y_c'$ planes. Accordingly, each of the linear accelerometers senses a component of gravity and the accelerometer 14 develops a signal $$\ddot{X}_c$$

corresponding to $g_{xc}$ and the accelerometer 16 develops a signal $\ddot{Y}_c$ corresponding to $g_{yc}$ and the accelerometer 18 develops a signal $$\ddot{Z}_c$$

corresponding to $g_{zc}$. The ratio of $g_{yc}$ to the vector sum of $g_{xc}$ and $g_{zc}$ yields the tangent of angle $a_1$ and this relation may be expressed as:

$$a_1 = \tan^{-1} \frac{\ddot{Y}_c}{\sqrt{\ddot{X}_c^2 + \ddot{Z}_c^2}} \quad (13)$$

It is also apparent that an expression for $a_2$ may be written as:

$$a_2 = \tan^{-1} \frac{\ddot{Z}_c}{\ddot{X}_c} \quad (14)$$

Thus the attitude of the aircraft relative to the vertical is determined and the azimuth may be determined by an external theodolite as shown in FIGURE 4. The theodolite, positioned at T, measures the azimuth ($\Psi_T$) and elevation ($\alpha_T$) angles of a beam of light reflected from the cylindrical mirror 32 rigidly mounted on the platform 12. The purpose of using a cylindrical mirror instead of a flat mirror is to allow the theodolite to be placed in a position independent of the horizontal plane of the mirror. From inspection of the geometry of FIGURE 4, the azimuth angle $\Psi_m$ of the projection of the aircraft $Y_c$ axis onto the horizontal plane is given by:

$$\Psi_m = \Psi_T - \Psi_1 - 90° \quad (15)$$

This may be expressed in terms of measured angles by substituting:

$$\Psi_1 = \sin^{-1} \frac{AB}{BT} = \sin^{-1} \frac{BM \cot \delta}{BM/\tan \alpha_T}$$

$$= \sin^{-1} (\tan \alpha_T \tan a_1) \quad (16)$$

into Equation 15 to obtain:

$$\Psi_m = \Psi_T - \sin^{-1}(\tan \alpha_T \tan a_1) - 90° \quad (17)$$

There will be no ambiguity in the arcsine function since the geometry of FIGURE 4 shows that the angle $\Psi_1$ always falls within the range of plus or minus 90 degrees.

Figure 5:
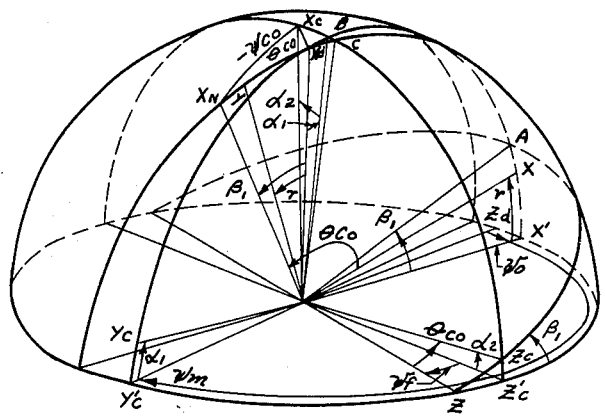

Since there are no linear displacements involved in determining the initial angles, the inertial, aircraft and departure axes can be placed together as shown in FIGURE 5. With the ends of the axes terminating on a common sphere, the final resolutions may be determined by using spherical trigonometry. FIGURE 6a is an enlargement of the triangle $Z-Z_c-Z_c'$ in FIGURE 5 in which (see Pierce, Equation 625, in "A Short Table of Integrals," Ginn & Co., Boston, 1929):

$$\cos \theta_{co} = \cos \Psi_f \cos a_2 + \sin \Psi_f \sin a_2 \cos (90° + a_1) \quad (18)$$

Figure 6:
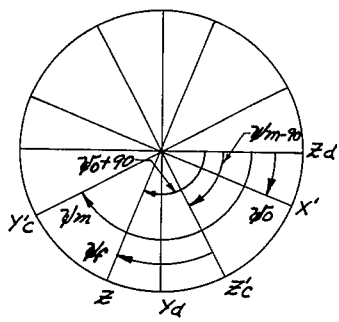
Figure 6A:
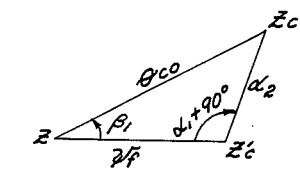

From FIGURE 6, showing the horizontal plane of FIGURE 5, it is apparent that:

$$\Psi_f = \Psi_o - \Psi_m + 180° \quad (19)$$

where, $\Psi_o$ is the azimuth of the projection of the X inertial axis on the departure point horizontal at the initial time $t_o$. By combining Equations 17 and 18, the initial angle $\theta_{co}$ can be expressed as:

$$\theta_{co} = \cos^{-1}[\sin a_1 \sin a_2 \sin(\Psi_o - \Psi_m)$$
$$- \cos a_2 \cos (\Psi_o - \Psi_m)] \quad (20)$$

Thus the initial conditions computer 30 operates upon the signals from the linear accelerometers 14, 16, and 18, the theodolite 32, and the signal $\Psi_o$ from manual device 36 in accordance with Equation 20 to develop a signal corresponding to the initial angle $\theta_{co}$. No ambiguity will occur since $\theta_{co}$ is defined to be greater than zero and less than 180 degrees as indicated in FIGURE 2.

Figure 6B:
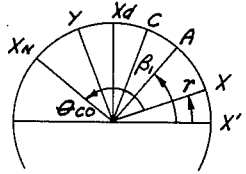

From FIGURE 6b, which represents a plane through the origin, $X_N$, and X in FIGURE 5, the expression for the initial value of angle $\phi_{co}$ may be written as:

$$\phi_{co} = 90° + \beta_1 - \gamma \quad (21)$$

where $\gamma$ is the angle of the X inertial axis above the departure point horizontal at the initial time $t_o$ and $\beta_1$, as derived from FIGURE 6a by Pierce's Equation 627 is.

$$\beta_1 = \tan^{-1} \frac{\cos a_1 \sin a_2}{\cos a_2 \sin (\Psi_m - \Psi_o) - \sin a_1 \sin a_2 \cos (\Psi_m - \Psi_o)} \quad (22)$$

No ambiguity will occur in $\beta_1$ so long as separation of the signs of the numerator and denominator in Equation 22 are maintained. Thus the initial angle $\phi_{co}$ is expressed in terms of measured data by combining Equations 21 and 22:

$$\phi_{co} = 90° + \tan^{-1}$$
$$\left( \frac{\cos a_1 \sin a_2}{\cos a_2 \sin (\Psi_m - \Psi_o) - \sin a_1 \sin a_2 \cos (\Psi_m - \Psi_o)} \right) - \gamma \quad (23)$$

The initial conditions computer operates upon the linear accelerometer signals, theodolite signals and the signal $\gamma$ from the manual device 38 in accordance with Equation 23 to develop a signal corresponding to the initial angle $\phi_{co}$.

Figure 6C:
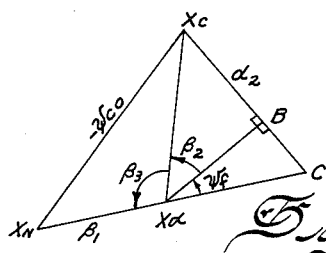

The spherical triangle $X_N-X_c-X_d$ of FIGURE 5 is reproduced in FIGURE 6c for clarity and from Pierce's Equation 627:

$$\Psi_{co} = -\tan^{-1} \frac{\sin \beta_1 \sin \beta_3}{\sin \theta_{co} \cos \beta_3 + \cos \beta_1 \sin \beta_3 \cos \theta_{co}} \quad (24)$$

Using triangle $X_d-X_c-b$ together with Pierce's equation:

$$\beta_2 = \tan^{-1} \frac{\tan a_2}{\sin a_1} \quad (25)$$

Since this angle $a_2$ is in the range of plus or minus 90 degrees, there is no ambiguity in using the tangent $a_2$ directly but the angle $\beta_2$ can lie in any quadrant and the signs of the fractions should be kept separate. From FIGURE 6c and Equation 19, $\beta_3$ can be expressed:

$$\beta_3 = \Psi_m - \Psi_o - \beta_2 \quad (26)$$

Accordingly, the initial angle $\Psi_{co}$ may be expressed in terms of measured data by substituting Equations 20, 22, 25, and 26 into Equation 24 and the computer 30 operates upon the data accordingly to develop a signal corresponding to the initial angle $\Psi_{co}$. The negative sign in Equation 24 is due to $\Psi_{co}$ being measured positively from $X_N$ to $X_c$ about the $Z_c$ axis.

The initial values $$\dot{\theta}_{co}, \dot{\Psi}_{co} \text{ and } \dot{\phi}_{co}$$

are due to earth rotation. The earth rotational velocity $w_e$ can be considered as a vector in the direction of the north polar axis which may be resolved into components along the aircraft axes $X_c$, $Y_c$, and $Z_c$ to obtain the initial values. For the purpose of resolution, the geocentric latitude $\lambda_{dc}$ is derived from the departure point geographical latitude $\lambda_d$ and earth eccentricity $e$ as:

$$\lambda_{dc} = \tan^{-1}[(1-e^2)\tan\lambda_d] \quad (27)$$

and by resolution:

$$\dot{\phi}_{co} = -w_e \sin\Psi_o \cos\lambda_{dc} \quad (28)$$

$$\dot{\theta}_{co} = w_e[\sin\lambda_{dc}\cos\beta_1 - \cos\lambda_{dc}\sin\beta_1\cos\Psi_c] \quad (29)$$

$$\dot{\Psi}_{co} = w_e\{[\cos\beta_1\cos\Psi_o\cos\lambda_{dc} + \sin\beta_1\sin\lambda_{dc}]\sin\theta_{co}$$
$$-\cos\theta_{co}\sin\Psi_o\cos\lambda_{dc}\} \quad (30)$$

Thus the initial values $$\dot{\phi}_{co}, \dot{\theta}_{co}, \text{ and } \dot{\Psi}_{co}$$

are readily expressed in terms of known data by substituting Equations 20, 22, and 27 into Equations 28, 29, and 30 as required. This operation is performed by the computer 30 to derive signals corresponding to the initial angular rates $$\dot{\phi}_{co}, \dot{\theta}_{co}, \text{ and } \dot{\Psi}_{co}$$

Having described the inertial guidance system and the system operation and equations, a description will be given of its application in a system for indicating the position of an aircraft in terms of altitude, longitude and latitude. The inertial axes X, Y, and Z, as shown in FIGURE 7, are selected with the origin at the center of the earth and with the X axis aligned with the earth polar axis, the Y axis along a line from the earth center to the junction of the equator in the departure point meridian at time of departure, and the Z axis mutually perpendicular to the X and Y axes. In this orientation the value of $\Psi_o$ is zero and the value of $\gamma$ is the aircraft geocentric latitude $\lambda_{dc}$. The aircraft axes $X_c$, $Y_c$, and $Z_c$ correspond with the yaw, roll and pitch axes as in FIGURE 1.

The velocity of the aircraft with respect to the inertial axes is obtained in terms of components $V_x$, $V_y$, and $V_z$ by subtracting the mass attraction, or gravitation components, $G_x$, $G_y$, and $G_z$ from the corresponding linear acceleration quantities $$\ddot{X}, \ddot{Y}, \text{ and } \ddot{Z}$$

and integrating with respect to time:

$$V_x = \int_0^t (\ddot{X} - G_x) dt + V_{xo} \quad (31)$$

$$V_y = \int_0^t (\ddot{Y} - G_y) dt + V_{yo} \quad (32)$$

$$V_z = \int_0^t (\ddot{Z} - G_z) dt + V_{zo} \quad (33)$$

where the initial velocities $V_{xo}$ and $V_{yo}$ are zero because of the choice of coordinates and the initial velocity $V_{zo}$ is due to Earth rotation and has a value dependent upon the radial distance $R_d$ of the departure point from the center of Earth and upon the geocentric latitude $\lambda_{dc}$ of the departure point in accordance with:

$$V_{zo} = w_e R_d \cos\lambda_{dc} \quad (34)$$

in which:

$$R_d = \frac{R_p}{\sqrt{1-e^2\cos^2\lambda_{dc}}} + h_d \quad (35)$$

where $R_p$ is the polar sea level radius of Earth, $e$ is the eccentricity of the ellipsoid representing Earth, and $h_d$ is the altitude of the departure point.

The values of the Earth's mass attraction radial component $G_R$ and meridial component $G_L$ have been developed in terms of radial distance, geocentric latitude, and Earth eccentricity by Campbell in Report No. 10060, "Fundamentals of Inertial Navigation," Chance Vought Aircraft, Inc., 1956. These components may be converted to inertial coordinates by resolution through the longitude difference and latitude to obtain values of $G_x$, $G_y$, and $G_z$. The position of the aircraft in inertial space coordinates X, Y, and Z may be obtained by integrating with respect to time the velocities obtained from Equations 31, 32, and 33.

$$X = \int_0^t V_x dt + X_o \quad (36)$$

$$Y = \int_0^t V_y dt + Y_o \quad (37)$$

$$Z = \int_0^t V_z dt + Z_o \quad (38)$$

where the initial position $X_o$ is $R_d \sin\lambda_{dc}$, $Y_o$ is $R_d \cos\lambda_{dc}$, and $Z_o$ is zero. In order to express the aircraft position in polar coordinates, the trigonometric relationships shown in FIGURE 7 permit determination of the angle $u_{cc}$ from the departure point meridial plane to the aircraft meridial plane as:

$$u_{cc} = -\tan^{-1}\frac{Z}{Y} \quad (39)$$

and the geocentric latitude $\lambda_{cc}$ of the aircraft is $$\lambda_{cc} = \tan^{-1}\frac{X}{\sqrt{Y^2+Z^2}} \quad (40)$$

and the radial distance $R_c$ from the center of Earth to the aircraft is $$R_c = \sqrt{X^2+Y^2+Z^2} \quad (41)$$

The geographical position of the aircraft in terms of geographic latitude $\lambda_c$, longitude $u_c$, and altitude $h_c$ can be obtained from the preceding equations as:

$$\lambda_c = \tan^{-1}\frac{X}{(1-e^2)\sqrt{(Y^2+Z^2)}} \quad (42)$$

$$u_c = u_{cc} + u_d + w_e t \quad (43)$$

$$h_c = R_c - \frac{R_p}{\sqrt{1-e^2\cos^2\lambda_{cc}}} \quad (44)$$

Ground velocity $V_c$ of the aircraft may be determined by using the Coriolis equation for velocity (see Page op. cit.):

$$\overline{V}_c = \overline{V} - \overline{w}_e x \overline{R}_c \quad (45)$$

where $\overline{V}$ is the velocity of the aircraft with reference to the inertial axes. The ground velocity may be expressed in terms of inertial components as:

$$V_{cx} = V_x \quad (46)$$

$$V_{cy} = V_y + w_e Z \quad (47)$$

$$V_{cz} = V_z - w_e Y \quad (48)$$

where may be resolved to obtain the eastward velocity component $V_E$, northward component $V_N$, and vertical component $V_V$ of ground velocity as follows:

$$V_E = (V_y + Zw_e)\sin u_{cc} + (V_z - Yw_e)\cos u_{cc} \quad (49)$$

$$V_N = V_x \cos\lambda_{cc} - [(V_y + Zw_e)\cos u_{cc} - (V_z - Yw_e)\sin u_{cc}]\sin\lambda_{cc} \quad (50)$$

$$V_V = V_x \sin\lambda_{cc} + [(V_y + Zw_e)\cos u_{cc} - (V_z - Yw_e)\sin u_{cc}]\cos\lambda_{cc} \quad (51)$$

Accordingly, by providing computer facility for the solution of Equations 31 through 51, the aircraft geographic position and ground velocity may be determined from the Eulerian angles and linear inertial accelerations developed by the subject guidance system.

It will now be apparent to those skilled in the art that the subject guidance system may be applied to all types of guidance problems and is especially well adapted for use in inertial space guidance for ballistic missiles and the like and for use in local vertical guidance for cruise type vehicles. Although the description of this invention has been given with reference to a particular embodiment, it is not to be construed in a limiting sense. Numerous variations and modifications within the spirit and scope of the invention will now occur to those skilled in the art. For a definition of the invention, reference is made to the appended claims.

I claim:

1. An inertial guidance system for vehicles; a vehicle defining three mutually orthogonal vehicle axes, an initial conditions computer defining a set of inertial reference coordinate axes, a set of three angular accelerometers having their input axes fixedly aligned with respective vehicle axes and developing output signals corresponding to angular acceleration about the respective vehicle axis, converter and integrator means connected with the angular accelerometers and the initial conditions computer for developing output signals corresponding to the respective Eulerian angles relating the vehicle axes to the inertial axes, a set of three linear accelerometers having their input axes fixedly aligned with respective vehicle axes and developing output signals corresponding to linear accelerations along the vehicle axes, an acceleration converter connected with the linear accelerometers and with the converter and integrator means for resolving the linear acceleration signals through the Eulerian angles to develop output signals corresponding to the linear accelerations with respect to the inertial reference coordinate axes.

2. In combination with a vehicle, an inertial guidance system comprising reference means developing signal quantities corresponding to the initial angles between the respective vehicle axes and predetermined coordinate reference axes, an angular accelerometer corresponding to each vehicle axis and having its input axis aligned therewith to develop an angular acceleration signal quantity means connected with said accelerometers and the reference means for doubly integrating the acceleration signal quantities with respect to time and adding the respective initial angle signal quantities thereto to obtain the Eulerian angles defining the angular relation between the corresponding aircraft axes and the coordinate reference axes, a linear accelerometer corresponding to each vehicle axis and having its input axis aligned therewith to develop linear acceleration signal quantities relative to the vehicle axes, means connected with the linear accelerometers and the last mentioned means for resolving the linear acceleration signal quantities through the Eulerian angles to develop linear acceleration signal quantities relative to the coordinate reference axes.

3. In combination with a vehicle having mutually orthogonal pitch, yaw, and roll axes, an inertial guidance system comprising initial conditions means developing signal quantities corresponding to the initial angles between the respective vehicle axes and predetermined mutually orthogonal coordinate reference axes, an angular accelerometer corresponding to each vehicle axis and having its input axis aligned therewith to develop an angular acceleration signal quantity, an angle coordinate converter and an integrator, said converter being connected with said accelerometers and the integrator for developing signal quantities corresponding to the second time derivative of the Eulerian angles defining the angular relation between the vehicle axes and the coordinate reference axes, said integrator being connected with the converter and the initial conditions means for doubly integrating the acceleration signal quantities with respect to time and adding the respective initial angle signal quantities thereto to obtain the Eulerian angles, a linear accelerometer corresponding to each vehicle axis and having its input axis aligned therewith to develop linear acceleration signal quantities relative to the aircraft axes, an acceleration coordinate converter connected with the linear accelerometers, the angle coordinate converter and the integrator for resolving the linear acceleration signal quantities through the Eulerian angles to develop linear acceleration signal quantities relative to the coordinate reference axes.

4. An inertial guidance system for a vehicle defining three mutually orthogonal vehicle axes; an initial conditions computer defining a set of inertial coordinate reference axes in mutually orthogonal relation, angular acceleration measuring means developing output signals corresponding respectively with the angular acceleration about each vehicle axis, an angle coordinate converter connected with the measuring means for resolving the angular acceleration signals through the Eulerian angles relating the vehicle axes and the inertial axes, integrating means having an input connected with the computing means and an input connected with the converter, said integrating means having an output connected with an input to the converter whereby the integrating means develops output signals corresponding respectively to the Eulerian angles, linear acceleration measuring means developing output signals corresponding respectively with the linear accelerations along each vehicle axis, an acceleration coordinate converter having an input connected with the linear acceleration measuring means and an input connected with the integrating means for resolving the linear acceleration signals through the Eulerian angles to develop output signals corresponding respectively to the linear accelerations along the inertial axes.

References Cited by the Examiner

UNITED STATES PATENTS

| | | | |
|---|---|---|---|
| 2,895,670 | 7/1959 | Newell | 235—61 |
| 2,945,643 | 7/1960 | Slater | 244—14 |
| 3,078,042 | 2/1963 | Grado | 244—14 |
| 3,087,333 | 4/1963 | Newell | 235—61 |

BENJAMIN A. BORCHELT, *Primary Examiner.*

FREDERICK M. STADER, CHESTER L. JUSTUS, SAMUEL FEINBERG, *Examiners.*